Sept. 16, 1930.  J. A. PAPALAS  1,775,780
STEPPED FASTENING FOR CORRUGATED PLATES
Filed Nov. 15, 1927
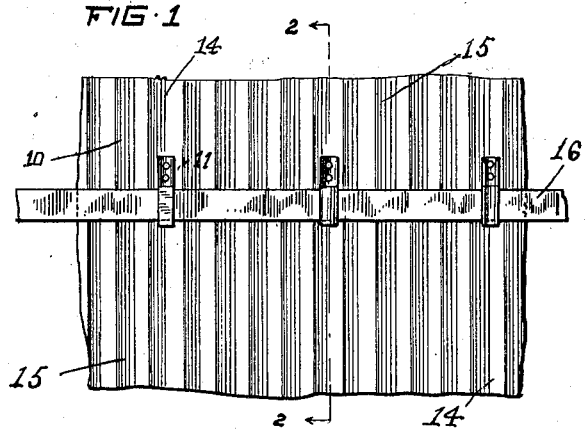
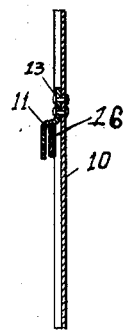
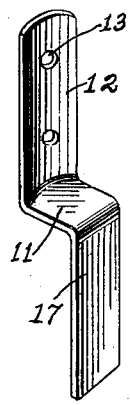
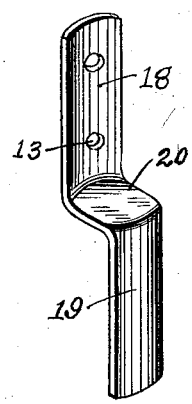
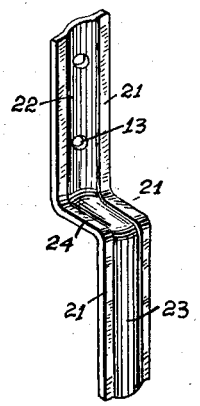
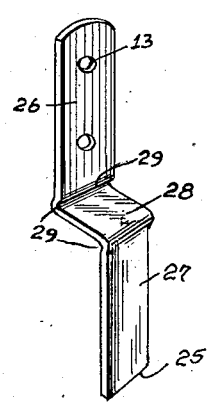
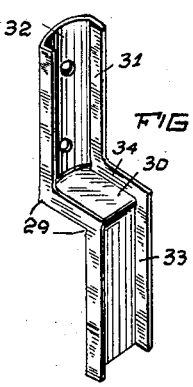
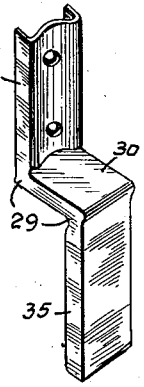
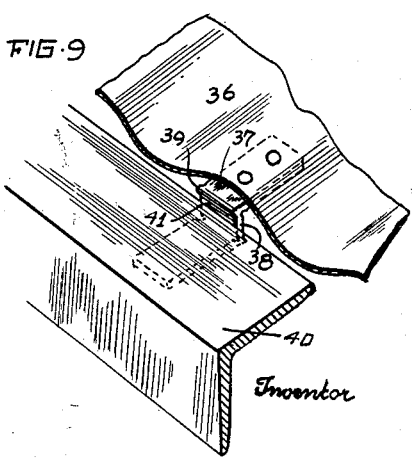
Inventor
John A. Papalas Patented Sept. 16, 1930

1,775,780

UNITED STATES PATENT OFFICE

JOHN A. PAPALAS, OF CLEVELAND, OHIO

STEPPED FASTENING FOR CORRUGATED PLATES

Application filed November 15, 1927. Serial No. 233,506.

This invention relates to stepped fastenings for corrugated plates, and more especially for fastenings formed of stepped sections whereby a shoulder or positive step at an angle to the main sections may serve to prevent the plates to which the fastenings are applied from slipping relative to each other or to the part bearing the fastenings.

It is an object of my invention to provide stepped fastenings whose sections shall have corrugations or curved portions of similar or different radii, or in which one section may be plane and the other corrugated, as the particular circumstances may require. In any case, one section of the fastening will be provided with spaced apertures to receive bolts or rivets to attach the fastening to one or more corrugated or plane plates, so that the other section of the fastening may contact a support bar or other support member.

It is a further object of my invention to provide means for strengthening fastenings of this kind, and I have illustrated such means as by folding the material at the angles of the sections with the connecting shoulder, and filling the points of folding or connecting with suitable alloy such as solder whereby the strength of the fastening will be greatly enhanced without tending to lessen the usefulness of the parts in any way.

At least one of the sections of the fastenings is usually plane to make it adapted to fit the surface of a flat bar or other support member, while the other section will be curved on a longitudinal axis to fit well the corrugation of a sheet upon which the fastening is to be secured, as by riveting or bolting. It is therefore, an object of my improvements to provide my fastenings with sections that are so curved or flanged as to possess great resistance to angular bending strains, and hold the metal sheets quite fixedly against relative movement upon the support element.

With these objects in view and having described the results desired, my invention will be seen to embody certain combination and arrangement of parts as will be illustrated in the accompanying drawings, and pointed out in the claims hereunto appended.

Figure 1 is an inverted plan view of a portion of a metallic sheet, a support bar extending transverse of the sheet, and a plurality of stepped fastenings holding one upon the other;

Figure 2 is a longitudinal section on the plane indicated by the line 2—2 of Fig. 1;

Figures 3 to 6 show in perspective, different forms of stepped fastenings anyone of which may be used for the purpose indicated in Fig. 1;

Figures 7 and 8 show in perspective, other forms of such fastenings provided with certain flanges for strengthening the same, but by a means different from that illustrated in the other views, and Figure 9 is a perspective view of another form of fastening fixedly secured to a corrugated sheet and resting upon an L-bar, the section of the fastening engaging the groove in the corrugated sheet being flat thus providing an opening about the securing means.

The stepped fastenings of which my improved structures consist have a dual function—that of binding a plurality of metal sheets together and securing them against lateral relative movement, as well as holding the sheets or plates as a unit against relative movement upon the bar or other support for the unit itself. To afford suitable certainty of accomplishing such functions, I apply at the back side of the sheets, as sheet 10, elongated metal fastenings having sections at their ends united by cross steps or shoulders 11 midway of the length of the fastenings, the sections being in substantial parallelism. The various forms of fastenings herein shown have the same general purpose but are constructed somewhat differently, as will now be explained in detail.

In Fig. 3 of the drawings, is shown a fastening which is curved in cross section at one portion 12 having apertures 13 for receiving therein securing means for attaching said portion 12 to the troughs 14 of the corrugations 15, when the fastening is used to support the sheet 10 upon a transverse bar 16, as illustrated in Fig. 1. The opposite portion 17 of the fastening is shown in Fig. 3 as flat, and serves well as means engaging the bar 16 for the purpose stated. The step 11 of this form will serve to bear the great part of the weight of the sheet 10 upon the bar 16. This is shown clearly in Fig. 2.

The form illustrated in Fig. 4, shows the section 18 curved oppositely to the other section 19, one being convex and the other concave. For brevity, this will hereinafter be termed the convexo-concave form of fastening. The step 20 serves the same purpose as in the other forms.

The form of fastening shown in Fig. 5 has side marginal flanges 21 that are flat and extend throughout both sections 22 and 23, as well as bound the shoulder or step 24. Otherwise, this form is substantially like that in Fig. 4. The apertures 13 are provided as in the other forms.

In Fig. 6 is shown the form 25 in which the sections 26 and 27 are connected to the step 28 by a fold or loop 29 at each end of the step. Additional strength is afforded by this provision, especially if the section 26 is convex. The section 27 is usually flat in this form. This fold 29 may also be used in the forms shown in Figs. 4 and 5, and usually are, but in these latter fastenings, the fold trough which is shown open in Fig. 6, is closed by filling such folds with solder or other alloy thus further affording strength at these angles where strain is peculiarly felt.

The forms shown in Figs. 7 and 8, have the loops or folds 29 between the sections and the ends of the steps 30, but are each provided with flanges throughout their length which are at right angles to the sections and steps. In Fig. 7, the flange 31 is bent toward the step 30 at either side of the convex section 32 and flanges 33 are bent away from the step, while flanges 34 are integral with flanges 31 and 33 as well as integral with the step, as shown. In Fig. 8, the flanges 35 are bent just opposite to those shown in Fig. 7. The folds in these forms, may be filled with metal or left open, usually filled.

The form shown in Fig. 9, is very effective in use for supporting heavy sheets, plane or corrugated, upon an L-form of bar. When a corrugated sheet 36 is to be supported, the flanged section 37 is applied in the trough of corrugations, and the opposite section rests upon the bar, the step being directed at substantially right-angles to the sections, and the flanges 38 directed away from the sheet and bar. The flanged structure of the fastening 39 provides a positive support for the corrugated sheets upon the bar 40, since the step 41 is at right angles both to the sheet and to the bar 40, and the flanges 38 provide the desired resistance to bending strain of the fastening.

While the single view of these drawings showing the manner of supporting the sheet upon the bar illustrate but one sheet, it is to be understood that these views are only suggestive and that any number of sheets may be of course secured together, as desired, and anyone of the same connected to a supporting bar in the manner shown in either view of Figs. 1 and 9. The support member is understood to be positioned on the inner side, and that the sheets will be outside of them, so that Fig. 1 is an inner plan view of the parts. These features are merely details of the supporting parts, the intermediate or fastening or stepped devices being the structures to which this application is directed. The fastening shown in Fig. 3, is disclosed in my earlier application now pending, Ser. No. 188,594, filed May 3, 1927, and there claimed, but not allowed therein to this date. Applicant does not, however, by filing this case, disclaim any rights he may have by disclosure of such structure in such earlier application.

It is further to be understood that applicant's invention is by no means to be limited to the exact arrangement of parts shown in these various views, but that any combinations of such structures that would ordinarily be suggested by these disclosures, are to be taken as within the purview of this invention. For example, certain of the other forms of stepped fastenings here shown, may be, and will under certain circumstances be essentially provided with the flanges 31 and 33 or flanges 35, or any one of them, as will be clear. The forms shown in Figs. 4, 5, 7 and 8, and possibly in Fig. 9, may be provided with the filling alloy or solder, as the case may be, in the manner indicated in Figs. 4 and 5.

The forms shown especially in Figs. 5 and 8 are very advantageous because of the fact that when one section of the fastening is applied in the trough of a corrugation of a sheet or plate, the edges of the section bearing against the walls of the plate corrugation will hold the curve of the fastening away from the bottom of the trough, and leaving a certain space therebetween and providing for circulation of air therethrough, and thus avoiding otherwise active rusting of the metal. The flanges 25 and 35 serve this purpose, as will be evident. The flanges 21 serve the same purpose as well as the step portion 24, permitting air circulation in both cases, and affording contacts at a limited area only.

What I claim and desire to secure by Letters Patent is—

1. A metal device for fastening the inner surface of a metal wall to a supporting bar comprising, end portions extending in parallelism and connected integrally by a step portion at right angles thereto, one of said end portions perforated to receive securing devices for attachment to said wall, and both end portions flanged laterally at an angle to the body thereof, there being folds or loops at the connections between the step and the end portions, and filling compositions in said loops.

2. A metal device for fastening the inner surface of a corrugated metal wall to a supporting bar comprising, elongated end portions extending in parallelism and integrally connected by a step portion at right angles thereto, one of said end portions being plane and connected to the step by a folded portion, and the opposite end portion being convexo-concave and perforated for receiving securing devices therein for attachment to said wall, the said folded portion being filled by a metal alloy.

In witness whereof I have hereunto set my hand and seal this 14th day of November, 1927.

JOHN A. PAPALAS.